United States Patent
Dulee et al.

(10) Patent No.: US 11,356,821 B2
(45) Date of Patent: *Jun. 7, 2022

(54) TOW AND EMERGENCY ROADSIDE ASSISTANCE LOCATING AND TRACKING MOBILE APPLICATION

(71) Applicant: STATE FARM MUTUAL AUTOMOBILE INSURANCE COMPANY, Bloomington, IL (US)

(72) Inventors: George T. Dulee, Bloomington, IL (US); Natalie R. Smith, Alpharetta, GA (US); Matthew Clarenson, Chatham, IL (US); Michelle Ann Curtis, Heyworth, IL (US); Justin Davis, Normal, IL (US); Jacob Alt, Downs, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 22 days.

This patent is subject to a terminal disclaimer.

(21) Appl. No.: 16/987,362

(22) Filed: Aug. 6, 2020

(65) Prior Publication Data

US 2020/0367036 A1    Nov. 19, 2020

Related U.S. Application Data

(63) Continuation of application No. 16/378,927, filed on Apr. 9, 2019, now Pat. No. 10,785,619, which is a
(Continued)

(51) Int. Cl.
*H04W 4/40* (2018.01)
*G06Q 40/08* (2012.01)
(Continued)

(52) U.S. Cl.
CPC ............ *H04W 4/40* (2018.02); *G06F 16/951* (2019.01); *G06Q 40/08* (2013.01); *H04L 63/083* (2013.01);
(Continued)

(58) Field of Classification Search
CPC ..... G06F 16/951; G06Q 40/08; H04L 63/083; H04N 5/23222; H04N 5/23293;
(Continued)

(56) References Cited

U.S. PATENT DOCUMENTS

| 8,526,910 B2 | 9/2013 | Messerly |
| 9,143,915 B2 | 9/2015 | Messerly |

(Continued)

FOREIGN PATENT DOCUMENTS

CA    2345857 A1    11/2002

*Primary Examiner* — Kashif Siddiqui
(74) *Attorney, Agent, or Firm* — Faegre Drinker Biddle & Reath

(57) ABSTRACT

A system for providing dynamic roadside assistance coordination may include a customer mobile device or vehicle in direct, or indirect, wireless communication with an insurance provider and/or service provider remote server. The customer's device may transmit a request for roadside assistance (e.g., towing services), and a current GPS location. In response, a closest, trusted service provider vehicle may be determined, and then directed to the customer's location. For instance, a software application may receive the customer location and compare it with availability information to match the customer with a close and trusted service provider. The customer's device may receive an acknowledgement that help is on the way, and be able to track the current location of the service provider vehicle while en route. Payment for the roadside assistance may be
(Continued)

automatically and electronically paid by the insurance provider. As a result, prompt and safe roadside assistance may be provided.

20 Claims, 7 Drawing Sheets

Related U.S. Application Data continuation of application No. 15/960,737, filed on Apr. 24, 2018, now Pat. No. 10,327,120, which is a continuation of application No. 15/648,191, filed on Jul. 12, 2017, now Pat. No. 10,021,532, which is a continuation of application No. 15/246,123, filed on Aug. 24, 2016, now Pat. No. 9,749,812.

(60) Provisional application No. 62/233,498, filed on Sep. 28, 2015, provisional application No. 62/213,841, filed on Sep. 3, 2015.

(51) Int. Cl.
| | |
|---|---|
| *H04W 4/029* | (2018.01) |
| *H04W 4/021* | (2018.01) |
| *G06F 16/951* | (2019.01) |
| *H04N 5/232* | (2006.01) |
| *H04W 4/02* | (2018.01) |
| *H04W 12/06* | (2021.01) |
| *H04L 9/40* | (2022.01) |

(52) U.S. Cl.
CPC ..... *H04N 5/23222* (2013.01); *H04N 5/23293* (2013.01); *H04W 4/02* (2013.01); *H04W 4/021* (2013.01); *H04W 4/029* (2018.02); *H04W 12/06* (2013.01)

(58) Field of Classification Search
CPC ....... H04W 12/06; H04W 4/02; H04W 4/021; H04W 4/029; H04W 4/40
See application file for complete search history.

(56) References Cited

U.S. PATENT DOCUMENTS

| | | | |
|---|---|---|---|
| 9,691,091 | B2 | 6/2017 | Jones et al. |
| 9,734,532 | B1 | 8/2017 | Brandmaier et al. |
| 10,327,120 | B1* | 6/2019 | Dulee ................ H04N 5/23222 |
| 10,785,619 | B1* | 9/2020 | Dulee .................. H04L 63/083 |
| 2009/0030885 | A1 | 1/2009 | Depasquale et al. |
| 2009/0313077 | A1 | 12/2009 | Wheeler, IV |
| 2010/0136954 | A1 | 6/2010 | Bennett, Jr. |
| 2011/0301985 | A1 | 12/2011 | Camp et al. |
| 2012/0041675 | A1 | 2/2012 | Juliver et al. |
| 2013/0246301 | A1 | 9/2013 | Radhakrishnan et al. |
| 2013/0304347 | A1 | 11/2013 | Davidson |
| 2014/0039935 | A1 | 2/2014 | Ernesto |
| 2015/0324720 | A1* | 11/2015 | Briggs .................... H04W 4/02 |
| | | | 705/7.22 |
| 2016/0092962 | A1* | 3/2016 | Wasserman ............. H04W 4/40 |
| | | | 705/26.7 |
| 2016/0210675 | A1 | 7/2016 | Smart, Jr. |
| 2016/0232598 | A1* | 8/2016 | Wasserman ............ G07C 5/008 |
| 2016/0275638 | A1 | 9/2016 | Korpi et al. |
| 2017/0039890 | A1 | 2/2017 | Truong et al. |
| 2017/0293950 | A1 | 10/2017 | Rathod |

\* cited by examiner

200A

| < | On TheRoad |
|---|---|
| 🚗 | Locksmith/tow |
| 🚕 | Taxi |
| 🚙 | Rental Car |
| ⛽ | Gas Station |
| 🏨 | Hotel |

🔍 Find an agent near you

●●●●●○ 📶　　1:30 PM　　100% 🔋
Close　　⊗ *State Farm*®　　Log In

User ID ●●●●
Password ●●●●●●●●

○ Show Password
◐ Remember my User ID

[ Log In ]

Don't have an account? Register now

Forgot password?

CUSTOMER LOGS INTO POCKET AGENT®
CUSTOMER SOFTWARE APPLICATION 202 — 300

FIG. 7A

TOW AND EMERGENCY ROADSIDE ASSISTANCE LOCATING AND TRACKING MOBILE APPLICATION

CROSS-REFERENCE TO RELATED APPLICATIONS

The current patent application is a continuation of, and claims the benefit of, U.S. application Ser. No. 16/378,927, filed Apr. 9, 2019 and entitled "TOW AND EMERGENCY ROADSIDE ASSISTANCE LOCATING AND TRACKING MOBILE APPLICATION," which is a continuation of, and claims the benefit of, U.S. patent application Ser. No. 15/960,737, filed Apr. 24, 2018 and entitled "TOW AND EMERGENCY ROADSIDE ASSISTANCE LOCATING AND TRACKING MOBILE APPLICATION," which is a continuation of and claims priority benefit with regard to all common subject matter to U.S. patent application Ser. No. 15/648,191 (now U.S. Pat. No. 10,021,532), entitled "TOW AND EMERGENCY ROADSIDE ASSISTANCE LOCATING AND TRACKING MOBILE APPLICATION," filed Jul. 12, 2017, which, itself, is a continuation of and claims priority benefit of U.S. patent application Ser. No. 15/246,123 (now U.S. Pat. No. 9,749,812), entitled "TOW AND EMERGENCY ROADSIDE ASSISTANCE LOCATING AND TRACKING MOBILE APPLICATION," filed Aug. 24, 2016, which, itself, claims priority benefit with regard to all common subject matter to: U.S. Provisional Application Ser. No. 62/213,841, entitled "TOW AND EMERGENCY ROADSIDE ASSISTANCE LOCATING AND TRACKING MOBILE APPLICATION," filed Sep. 3, 2015; and U.S. Provisional Application Ser. No. 62/233,498, entitled "TOW AND EMERGENCY ROADSIDE ASSISTANCE LOCATING AND TRACKING MOBILE APPLICATION," filed Sep. 28, 2015. The listed earlier-filed non-provisional applications and provisional applications are hereby incorporated by reference in their entirety into the current patent application. Further, the present non-provisional patent application is related to identically-titled co-pending non-provisional patent application Ser. No. 15/246,153, filed Aug. 24, 2016; and Ser. No. 15/246,084, filed Aug. 24, 2016.

FIELD OF THE INVENTION

The present disclosure generally relates to systems and methods for secure, location-based roadside resource matching, tracking, and management.

BACKGROUND

Existing software-based and mobile device-based systems for aiding motorists seeking roadside assistance rely on a fractured collection of information databases and lack effective means for adequate real-time quality and security control. For example, the most common method for a motorist to locate and obtain tow assistance involves opening a web browser or mobile application, searching a provider aggregation or mapping database for a provider in the area, and contacting the provider of choice. Occasionally, the motorist may access a provider review database to obtain information regarding one or more such providers before selecting one to contact. Such steps, when taken, involve accessing different information databases, leading to longer waits and complicated search efforts.

Motorists' fragmented reliance on multiple databases and database operators also hinders the ability of operators and providers to effectively track service calls from start to completion. For example, a review website operator may capture a subset of its users' subjective thoughts regarding provider efficacy; but such an approach does not capture other details regarding the providers' performance with non-reporting motorists and with respect to unreported aspects of service calls. Attempts to obtain such information directly from providers are even less likely to result in a trustworthy cross-section of data.

Certain existing systems combine provider contact information and provider review databases for access at a single URL or via a single mobile application. However, such systems rely on a patchwork of voluntarily-provided motorist feedback for quality and security control. Such feedback may be provided in the form of electronically-submitted comments or via survey soliciting numerical rankings and scalars that may be aggregated with other reviews to rate the providers. But the low response rate from motorists and the inevitable skew toward responses that are either unusually good or unusually bad tend to reduce the usefulness of these systems. Moreover, any security benefits motorists might realize are backward-looking; such solutions do not provide real-time information about the specific employee assigned to a motorist by a provider, nor about that employee's progress on the job.

There is therefore a need for a new system and method for aiding motorists in obtaining secure, location-based roadside resource matching and tracking.

BRIEF SUMMARY

Embodiments of the present technology relate to systems and computer-implemented methods for dynamic roadside assistance coordination. The embodiments may provide comprehensive coverage of customer-side and provider-side activities throughout and in relation to service runs. The embodiments may also enable a system operator not only to provide useful real-time progress and security data to customers, but to maintain a rich and dynamic network of providers in which customers are informed by objective, system-observed data. These benefits may be realized by a network of customer software applications, a network of provider software applications, and an operations server for performing and coordinating the system of embodiments of the present technology.

More particularly, in a first aspect, a system for providing dynamic roadside assistance coordination may be provided. The system may comprise a mobile electronic device of a provider. The provider mobile electronic device may execute a provider software application configured to obtain and transmit provider location information in connection with a service run by the provider. The system may also include a mobile electronic device of a customer. The customer mobile electronic device may execute a customer software application configured to obtain and transmit customer location information and to receive and display the provider location information on a screen. The system may further include an operations server having a memory element configured to store availability information associated with a plurality of roadside assistance service providers including the provider. The system may further include a processing element that executes an operations software application. The operations software application may be configured to receive the customer location information and compare the customer location information with the availability information to match the customer with the provider to facilitate providing roadside assistance to the customer or customer location. The system may include additional, less, or alternate functionality, including that discussed elsewhere herein.

In another aspect, a system for managing a dynamic roadside assistance network may be provided. The system may include a provider network having a plurality of copies of a provider software application installed separately on a plurality of provider mobile electronic devices belonging to a plurality of roadside assistance service providers. The provider software application may be configured to obtain and transmit provider location information in connection with the service runs. The system may further include a customer network having a plurality of copies of a customer software application installed separately on a plurality of customer mobile electronic devices belonging to a plurality of customers. The customer software application may be configured to obtain and transmit customer location information and to receive and display the provider location information on a screen. The system may further include an operations server having a memory element configured to store availability information associated with the plurality of roadside assistance service providers. The operations server may further have a processing element executing an operations software application. The operations software application may be configured to receive the customer location information and compare it to the availability information to match the customer with at least one provider of the plurality of roadside assistance service providers. The system may include additional, less, or alternate functionality, including that discussed elsewhere herein.

In still another aspect, a system for facilitating roadside assistance may be provided. The system may include a mobile electronic device of a provider that executes a provider software application. The provider software application may be configured to obtain and transmit provider location information in connection with a service run by the provider. The system may further include a mobile electronic device of a customer that executes a customer software application. The customer software application may be configured to obtain and transmit customer location information and to receive and display the provider location information on a screen. The system may further include an operations server having a memory element configured to store availability information associated with a plurality of roadside assistance service providers including the provider. The operations server may further have a processing element that executes an operations software application. The operations software application may be configured to receive the customer location information and compare the customer location information with the availability information to match the customer with the provider. The system may include additional, less, or alternate functionality, including that discussed elsewhere herein.

In still another aspect, a computer-implemented method for providing dynamic roadside assistance coordination may be provided. The method may include: (1) receiving customer location information from a mobile electronic device of a customer; (2) matching, via an operations server, the customer to a provider based upon the customer location information and availability information relating to a plurality of roadside assistance service providers including a provider; and/or (3) receiving provider location information of the provider relating to a service run from a provider mobile electronic device. The method may include additional, less, or alternate actions, including those discussed elsewhere herein.

In still another aspect, another computer-implemented method for providing dynamic roadside assistance coordination may be provided. The method may include: (1) distributing a customer software application configured to transmit customer location information via a customer mobile electronic device; (2) matching, via an operations server, the customer to a provider based upon the customer location information and availability information relating to a plurality of roadside assistance service providers including the provider; and/or (3) distributing a provider software application configured to transmit provider location information of the provider on a service run via a provider mobile electronic device. The method may include additional, less, or alternate actions, including those discussed elsewhere herein.

In still another aspect, a computer-implemented method for managing a dynamic roadside assistance network may be provided. The method may include: (1) providing a provider software application for execution on provider mobile electronic devices of a plurality of roadside assistance service providers, the provider software application being configured to obtain and transmit provider location information in connection with service runs; (2) providing a customer software application for execution on customer mobile electronic devices of a plurality of customers, the customer software application being configured to obtain and transmit customer location information and to receive and display the provider location information on a screen; (3) storing, via an operations server, availability information associated with the plurality of roadside assistance service providers; (4) receiving, via the operations server, the customer location information; and/or (5) comparing, via the operations server, the customer location information with the availability information to match the customer with a provider of the plurality of roadside assistance service providers. The method may include additional, less, or alternate actions, including those discussed elsewhere herein.

In still another aspect, a computer-implemented method for facilitating roadside assistance may be provided. The method may include: (1) receiving customer location information from a mobile electronic device of a customer; (2) matching, via an operations server, the customer to a provider based upon the customer location information and availability information relating to a plurality of roadside assistance service providers including a provider; and/or (3) receiving provider location information of the provider relating to a service run from a provider mobile electronic device. The method may include additional, less, or alternate actions, including those discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

FIGS. 7A, 7B, 7C and 7D illustrate various components of an exemplary system and a method for providing dynamic roadside assistance.

Figure 1:
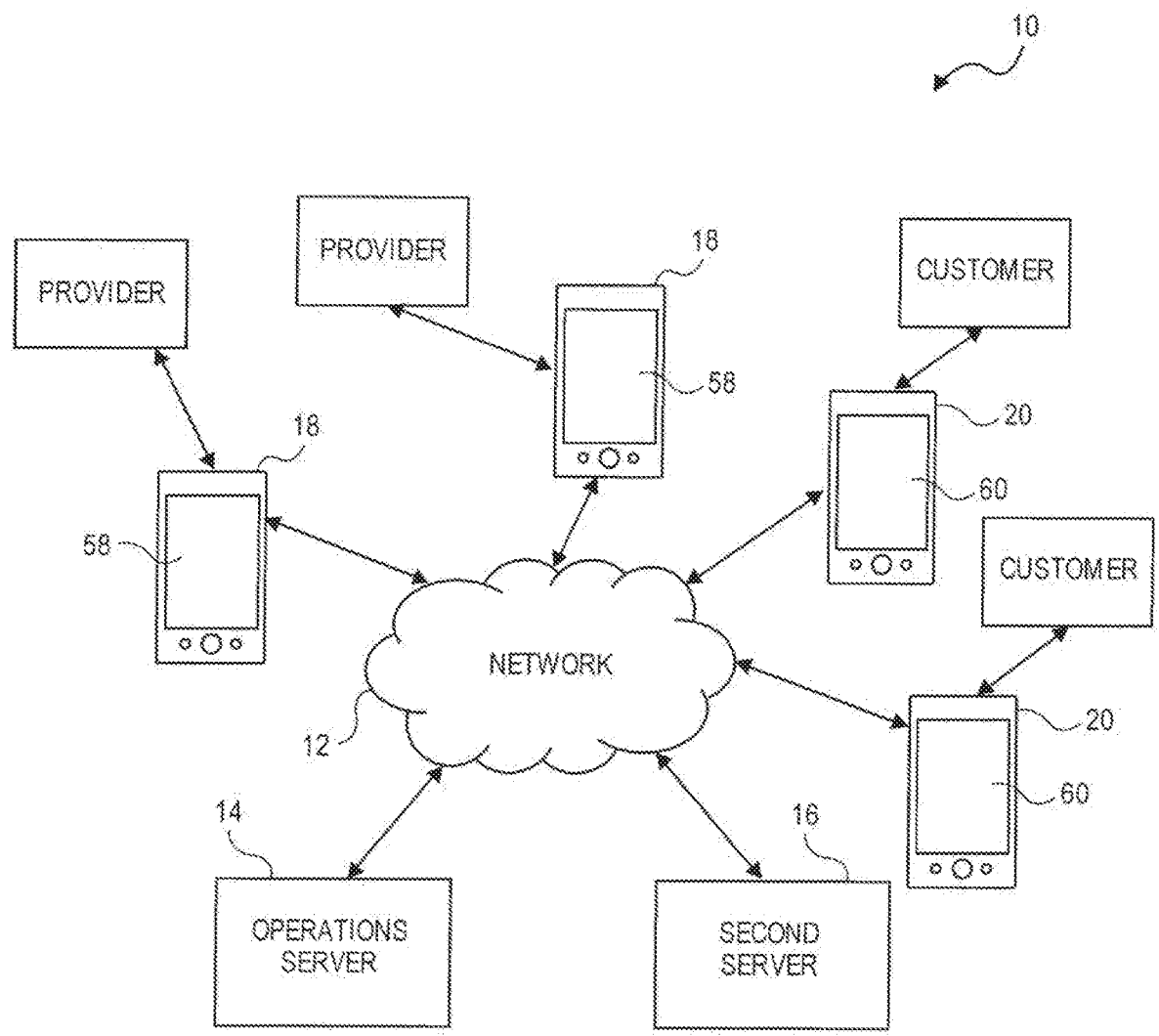
FIG. 1 illustrates various components of an exemplary system for providing dynamic roadside assistance shown in block schematic form.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, secure and convenient roadside assistance services and a managed provider network. The comprehensive and balanced exchange of information between a customer software application installed on a customer mobile electronic device, a provider software application installed on a provider mobile electronic device, and an operations software application installed on an operations server, permits exchange and storage of a superior data flow.

For example, the customer may be in need of roadside assistance and have access to his mobile electronic device. Accessing the customer software application, the customer may select the desired service. The customer software application may cause acquisition of geographic positioning coordinate data from a global positioning receiver and transmit this information to the operations server. The operations server may then match the customer to a provider selected from amongst a plurality of roadside assistance providers represented in a provider database accessible to the operations server.

A qualifying provider may then begin the service run. Consistent data flow throughout the run between the aforementioned software applications may permit the customer to be kept apprised of an estimated or projected arrival time of the provider's employee, the provider's location, and of security-related information, such as the identity of the employee and/or any historical performance data that may improve the customer's experience.

Following completion of the service run, the operations server may combine data collected autonomously and/or through submissions of the provider and/or employee, analyze same against a number of rules and/or average performance characteristics of other providers, and store the foregoing in a plurality of provider performance profiles, each associated with a provider. The operations server may further obtain and/or store additional external information in the provider performance profiles, for example ratings from external review databases and/or public records regarding criminal activity(ies) of provider employees or the like.

Exemplary Customer Benefits

The customer receives a number of benefits from utilizing embodiments of the present technology. Exemplary benefits to customers may include those mentioned below. For instance, one benefit may relate to secure and transparent provision of services by providers. The continuous exchange of the data and information discussed herein between the customer software application, the provider software application and operations software application mean that the provider and its employees will be keenly aware of their visibility throughout the course of a service run. Not only will this increase the chances that the provider's employee will take ownership of his or her performance, but will deter poor or perhaps devious performance of services and even criminal activity.

The customer may relatedly enjoy real-time security benefits through receipt and awareness of information regarding the provider employee specifically assigned to the service run. This may include a picture of the employee, which is perhaps the most potent and memorable piece of information for identifying imposters and the like that might seek to harm or take advantage of a stranded motorist.

The accumulation of information obtained through this relatively comprehensive assistance system goes beyond real-time service run benefits discussed above. Over time, the memory element of the operations database will accumulate performance data and characteristics in provider performance profiles, which may further include sub-files assigned to specific employees for added accuracy and richer information for provision to customers. This accumulated information will allow the operator of the operations server to weight the matching process and/or provide the customer with options for matching providers providing visibility as to provider pricing, history of expedient performance, network coverage status, history of security incidents, and the like. Moreover, this accumulated information may be untainted by subjective user reviews in certain embodiments, for example because it may be based upon collection of objective and comprehensive data rather than the voluntary and haphazard responses obtained through traditional user review mechanisms. The foregoing combine to provide a more robust and improved source of information for user selection and matching to providers.

In addition, combination of the foregoing functions in a system accessible via a single customer software application accessible on a mobile device dramatically improves the efficiency of obtaining roadside assistance services and provides greater surety as to the identity, quality, and status of insurance coverage of providers and service runs.

Further, the payment process for the service run may be improved by embodiments of the present technology. For example, the customer software application may pay directly from the customer mobile electronic device, request payment by an insurance provider, and/or receive an electronic invoice, all based upon automated process and/or as requested by the customer. The issuance of an invoice may even become automated, for example where the operations software application is configured to determine the conclusion of a service run automatically by divergence of the global positioning system (GPS) signals of the customer and provider, and to automatically issue an invoice appropriate for the contractual relationships between the parties. Still further, the customer may be saved the trouble of determining whether insurance coverage applies to an invoice for the service run based upon the determinations of the operations server based upon the provider database made throughout the matching process.

Specific embodiments of the technology will now be described in connection with the attached drawing figures. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Exemplary System

FIG. 1 depicts an exemplary environment in which embodiments of a system 10 may be utilized for transmitting and receiving location information, coverage criteria, billing information, and the other information described herein (the "system information"). The environment may include a network 12 and computer servers 14, 16 as seen in FIG. 1, with which the system 10 interfaces to send and receive system information. The system 10 may be utilized to automatically communicate with customers, providers and/or external databases, such as those operated by insurance carriers, criminal record custodians, and customer review websites. The system 10 may broadly comprise one or more provider mobile electronic devices 18, one or more customer mobile electronic devices 20, and the aforementioned one or more servers 14, 16 including an operations server 14 and second server 16. Provider mobile electronic device 18 may execute provider software application 22, customer mobile electronic device 20 may execute customer software application 24, operations server 14 may execute operations software application 26, and second server 16 may execute second server software application 28.

The network 12 may generally allow communication between the mobile electronic devices 18, 20 and the servers 14, 16, and also between the operations server 14 and the second server 16. The network 12 may include local area networks, metro area networks, wide area networks, cloud networks, the Internet, cellular networks, plain old telephone service (POTS) networks, and the like, or combinations thereof. The network 12 may be wired, wireless, or combinations thereof and may include components such as modems, gateways, switches, routers, hubs, access points, repeaters, towers, and the like. The mobile electronic devices 18, 20 generally connect to the network 12 wirelessly, such as radio frequency (RF) communication using wireless standards such as cellular 2G, 3G, or 4G, Institute of Electrical and Electronics Engineers (IEEE) 802.11 standards such as WiFi, IEEE 802.16 standards such as WiMAX, Bluetooth®, or combinations thereof.

Each computer server 14, 16 generally retains electronic data and may respond to requests to retrieve data as well as to store data. The computer servers 14, 16 may be embodied by application servers, database servers, file servers, gaming servers, mail servers, print servers, web servers, or the like, or combinations thereof. Furthermore, the computer servers 14, 16 may include a plurality of servers, virtual servers, or combinations thereof. The computer servers 14, 16 may be configured to include or execute software such as file storage applications, database applications, email or messaging applications, web server applications, or the like, in addition to and/or in conjunction with software applications 26, 28. The computer servers 14, 16 may apply business methods or algorithms, may utilize lookup tables or databases, or combinations thereof to determine insurance rates or premiums, terms of a loan, or both. Insurance providers and service providers may each own one or more computer servers 14, 16 that may automatically provide information about insurance policies and coverage criteria.

Figure 2:
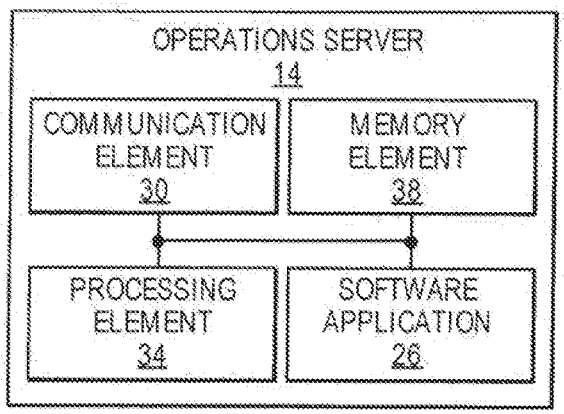
FIGS. 2 and 3 illustrate various components of exemplary servers that may be used with the system and shown in block schematic form.
Figure 3:
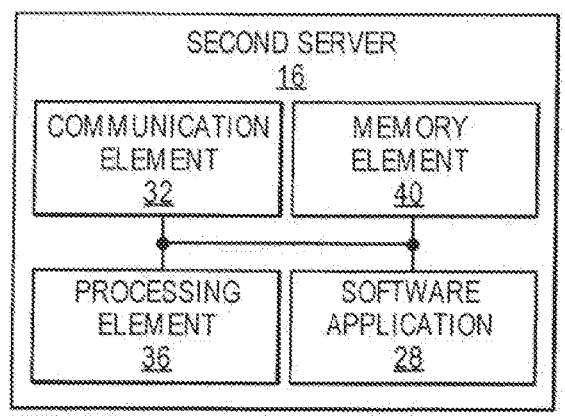

More specifically, the servers 14, 16, as shown in FIGS. 1-3, generally manage the transfer of data between mobile electronic devices 18, 20 and between one another. Each of the servers 14, 16 may also include a communication element 30, 32, a processing element 34, 36, and a memory element 38, 40.

The communication elements 30, 32 generally allow communication with external systems or devices. The communication elements 30, 32 may include signal or data transmitting and receiving circuits, such as antennas, amplifiers, filters, mixers, oscillators, digital signal processors (DSPs), and the like. The communication elements 30, 32 may establish communication wirelessly by utilizing RF signals and/or data that comply with communication standards such as cellular 2G, 3G, or 4G, IEEE 802.11 standard such as WiFi, IEEE 802.16 standard such as WiMAX, Bluetooth™, or combinations thereof. Alternatively, or in addition, the communication elements 30, 32 may establish communication through connectors or couplers that receive metal conductor wires or cables which are compatible with networking technologies such as ethernet. In certain embodiments, the communication elements 30, 32 may also couple with optical fiber cables. The communication elements 30, 32 may be in communication with or electronically coupled to memory elements 38, 40 and/or processing elements 34, 36.

The memory elements 38, 40 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory elements 38, 40 may include, or may constitute, a "computer-readable medium". The memory elements 38, 40 may store the instructions, code, code segments, software, firmware, programs, applications, apps, services, daemons, or the like that are executed by the processing elements 34, 36. The memory elements 38, 40 may also store settings, data, documents, sound files, photographs, movies, images, databases, and the like.

The processing elements 34, 36 may include processors, microprocessors, microcontrollers, DSPs, field-programmable gate arrays (FPGAs), analog and/or digital application-specific integrated circuits (ASICs), or the like, or combinations thereof. The processing elements 34, 36 may generally execute, process, or run instructions, code, code segments, software, firmware, programs, applications, apps, processes, services, daemons, or the like. The processing elements 34, 36 may also include hardware components, such as finite-state machines, sequential and combinational logic, and other electronic circuits that may perform the functions necessary for the operation of embodiments of the current inventive concept. The processing elements 34, 36 may be in communication with the other electronic components through serial or parallel links that include address busses, data busses, control lines, and the like.

Figure 4:
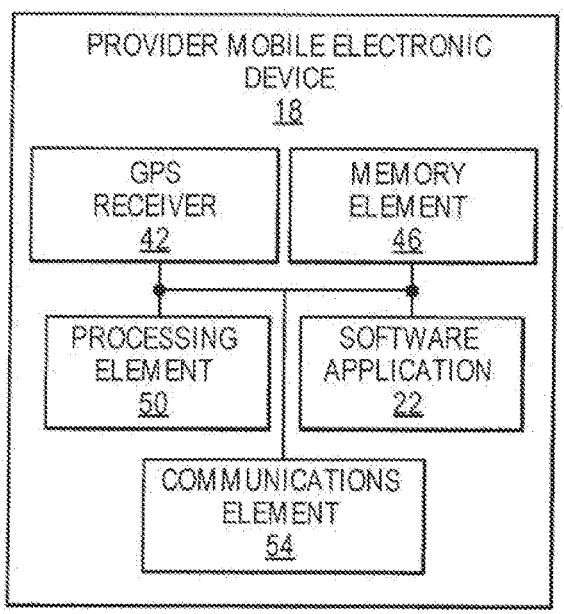
FIGS. 4 and 5 illustrate various components of exemplary mobile electronic devices that may be used with the system and shown in block schematic form.
Figure 5:
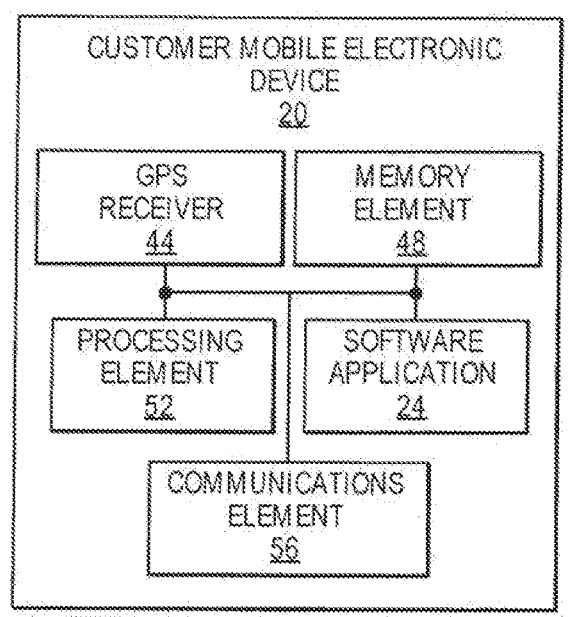

The mobile electronic devices 18, 20 may be embodied by a smart watch, a smart phone, a personal digital assistant (PDA), a tablet, a palmtop or laptop computer, a notebook, a netbook, a smart watch, smart glasses, wearable electronics, or other mobile device, and may be typically carried by, or near, the customer while driving. The mobile electronic devices 18, 20 may include GPS receiver elements 42, 44, memory elements 46, 48, processing elements 50, 52, software applications 22, 24 and/or communications elements 54, 56, as seen in FIGS. 4-5. Specifically for the mobile electronic devices 18, 20, the memory elements 46, 48 may store the software applications 22, 24, respectively, and the processing elements 50, 52 may execute the software applications 22, 24.

The majority of components of the mobile electronic devices 18, 20—more specifically, the communications elements 54, 56, processing elements 50, 52, and memory elements 46, 48—each operate under similar principles to those set forth above with respect to analogous components of the servers 14, 16. GPS receivers 42, 44 operate according to known principles for GPS receivers and/or chips common to smartphones.

The mobile electronic devices 18, 20 may also include displays 58, 60 (see, e.g., FIG. 1) which may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, or the like, or combinations thereof. The displays 58, 60 may possess a square or a rectangular aspect ratio and may be viewed in either a landscape or a portrait mode. In various embodiments, the displays 58, 60 may also include a touch screen occupying the entire screen or a portion thereof so that the display functions as part of a user interface. The touch screen may allow the user to interact with the mobile electronic device 18, 20 by physically touching, swiping, or gesturing on areas of the screen.

The software applications 22, 24 may generally control the behavior of the mobile electronic devices 18, 20 when the devices 18, 20 are interacting with the each other and with the servers 14, 16, for example via the network 12, according to the configurations described herein and according to the present inventive concept.

Exemplary Computer-Implemented Method

Figure 6:
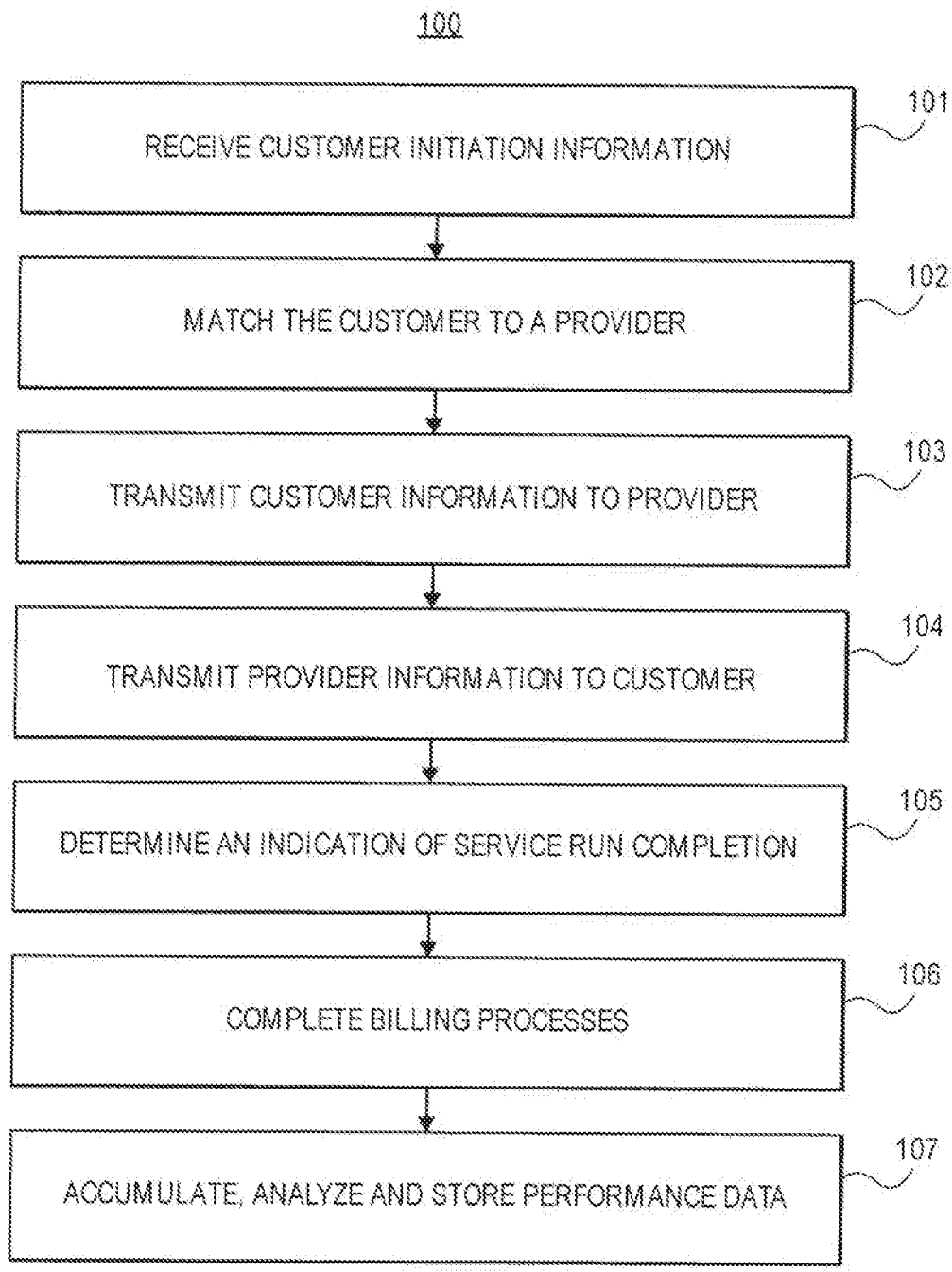
FIG. 6 illustrates at least a portion of the steps of a first exemplary computer-implemented method for providing dynamic roadside assistance coordination.
Figure 7B:
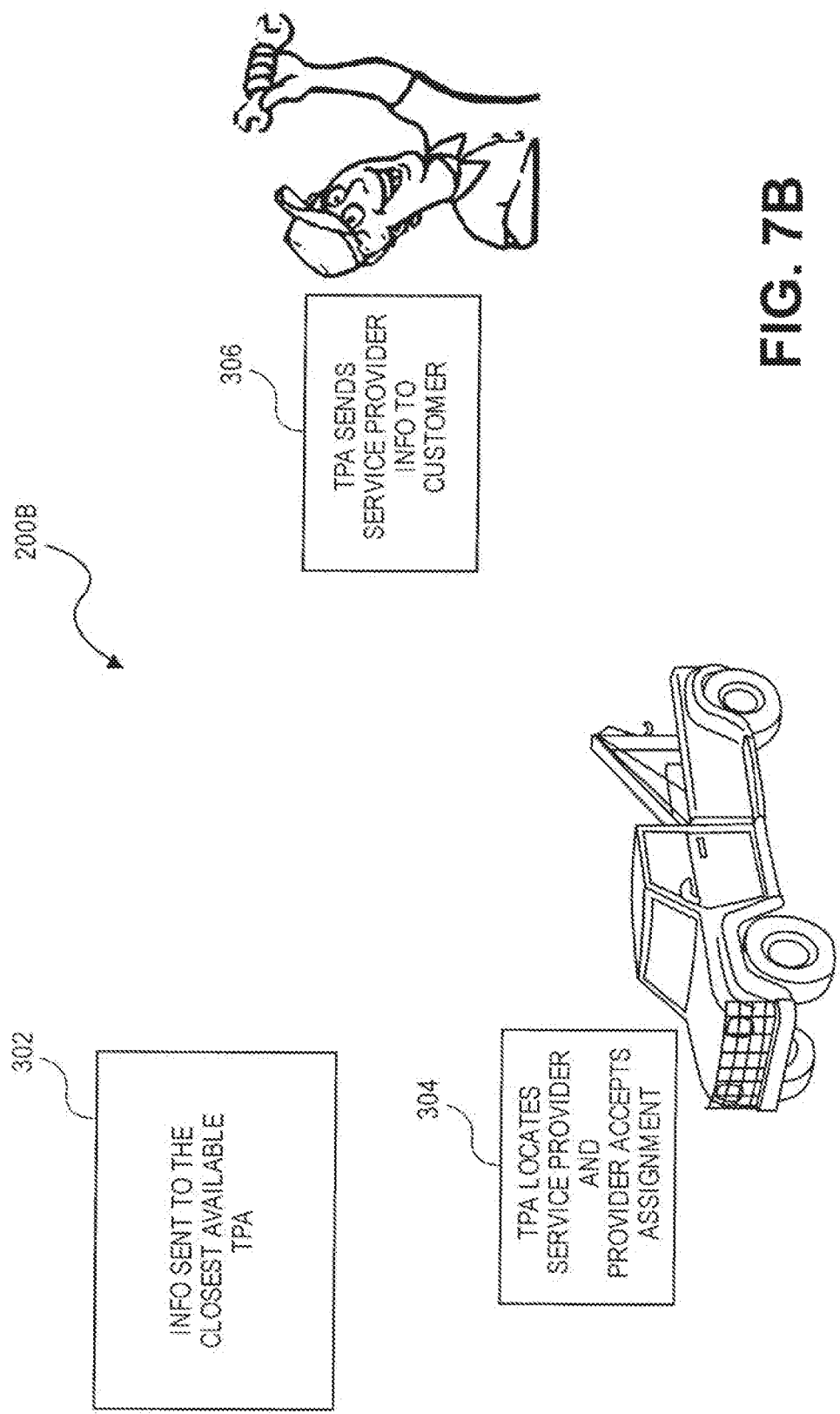
Figure 7C:
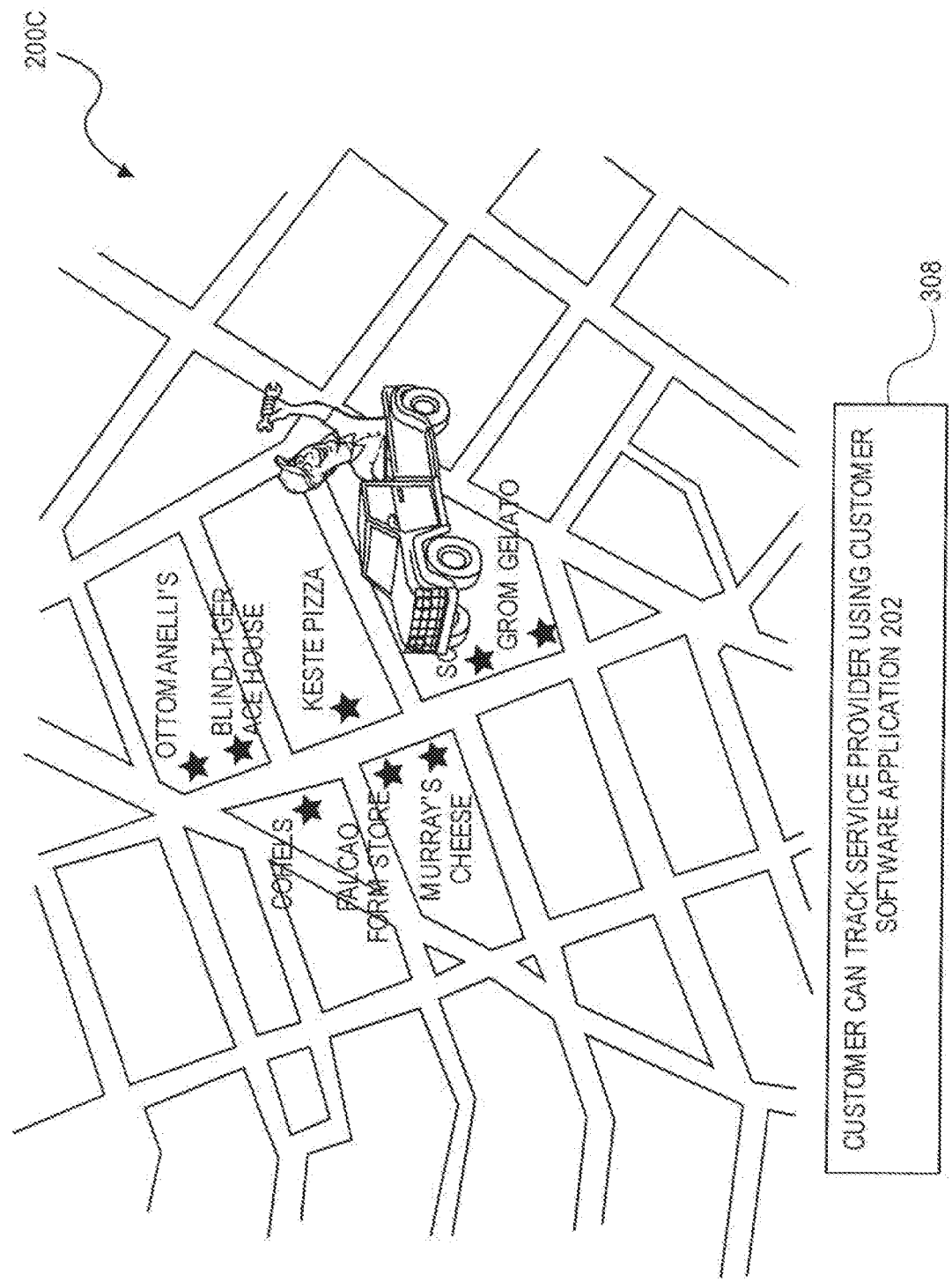
Figure 7D:
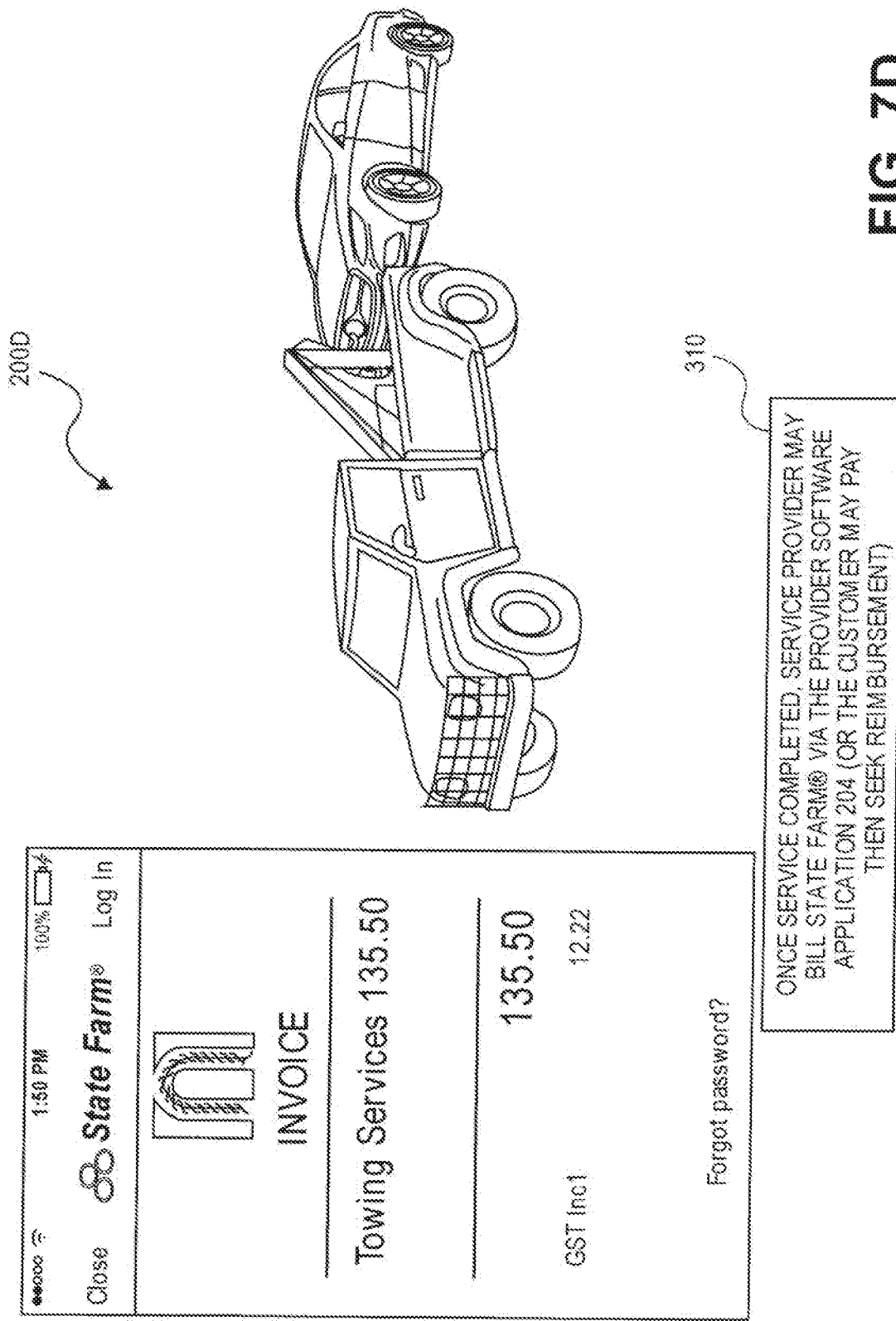

FIG. 6 depicts a listing of steps of an exemplary computer-implemented method 100 for providing dynamic roadside assistance coordination. The steps may be performed in the order shown in FIG. 6, or they may be performed in a different order. Furthermore, some steps may be performed concurrently as opposed to sequentially. In addition, some steps may be optional. The steps of the computer-implemented method 100 may be performed by the system 10.

Referring to step 101, the operations server 14 may receive customer information indicating a desire to initiate a service run. The customer may use the customer software application 24 to request a roadside service run by selecting a desired provider type. The customer software application 24 may employ known secure login techniques, such as password entry gateway, to permit access and use. The customer may select the desired provider type from among, for example, any of (a) tow, (b) lock out relief, (c) tire change, (d) jump start, and (e) fuel delivery. In some cases, the customer software application 24 may be configured to support a single provider type, for example only tow service providers, and thus selection of a desired provider type may simply comprise the customer's entry of a request for service.

The customer software application 24 may also instruct the collection of customer location information. The customer location information may be collected via a global positioning receiver 44 of the customer mobile electronic device 20. (As used herein, performing a function "via" an element means, in addition to its plain and ordinary meaning, to utilize the element in furtherance of the function.) The customer location information may alternatively be collected by the customer software application 24 via manual input at the customer mobile electronic device 20. The customer location information may be collected periodically or continuously by the customer software application 24, but may also be collected only once in connection with each requested service run. Collection may also be performed autonomously by the installed customer software application 24, or may be triggered by the customer, for example through selection of the desired provider type. The mode of collection for customer location information may be configured at least in part by the customer's selection of privacy setting during a setup or subsequent configuration process for the customer software application 24.

The customer location information and desired provider type may also be combined with additional information in a customer information bundle prior to or following the initial transmission by the customer mobile electronic device 20 to the operations server 14. Such additional information may include customer contact information and an insurance coverage type of the customer. The customer contact information may include a telephone number, e-mail address, physical address, or other similar information. The insurance coverage type may be a reference to a specific customer policy, group number, or type of policy such as "roadside plus" or similar moniker identifiable by the operations server as representing a level of coverage. The customer mobile electronic device 20 may transmit the customer information bundle to the operations server 14 via communications element 56.

Referring to step 102, the operations server 14 may match the customer to a provider based upon the customer information provided according to the steps set forth above. The processing element 34 of the operations server 14 may execute the operations software application 26 and memory element 38 may be configured to store a provider database containing availability information for a plurality of roadside assistance providers. The database may include information regarding a single provider type or several provider types. The availability information may include a range of geographic services offered by the provider and/or provider location information. The availability information may also include coverage criteria such as a flag associated with each of the plurality of roadside assistance providers indicating a network status of "in-network" or "out-of-network," i.e., indicating a qualification to complete the service run under one or more insurance coverage types. The coverage criteria may also be based upon an insurance policy status of the customer. Other known factors for determining insurance coverage may also be considered "coverage criteria" hereunder without departing from the spirit of the present inventive concept. The availability information may further include information about the pricing offered by the plurality of roadside assistance providers.

Upon receipt of the customer information bundle, the operations server 14 may match the customer to a provider using the provider database. For example, the desired provider type may be compared against the range of services offered by each provider in the database. Customer location information may be compared against the range of geographic services offered by qualifying providers and/or against such providers' location information to determine proximity and therefore likelihood of expedient completion of the service run. The operations server may further determine a list of qualifying providers by comparing against coverage criteria, for example by comparing the insurance coverage type of the customer against the network status flags of the providers to aid the customer in choosing a provider that qualifies to perform the service run under the customer's insurance policy. Where the coverage criteria is not stored locally, the operations server 14 may transmit at least a portion of the customer information bundle to second server 16 having a second processing element 36 for performing the desired analysis. The operations server 14 may be configured to receive the results of such a comparison, i.e., the indication of coverage criteria satisfaction, from the second server 16 via its communication element 30. Where several providers result from one or more of the above comparisons, the operations server 14 may transmit a request to the qualifying providers for voluntary submission of an estimated arrival time and/or an opportunity to submit a lower price bid, and may further refine the list of qualifying providers according to the fastest response time and/or lowest bid. It is envisioned that other, similar "tie breakers" may be utilized with the present technology without departing from the spirit of the present inventive concept.

The operations server 14 may further send one or more qualifying service providers a service run confirmation request. The service run confirmation request may be sent to the provider's mobile electronic device 18 (see, e.g., FIG. 4). The provider software application 22 may be configured to display at the user interface 58 of the device 18 an option for the provider to select or confirm whether the service run is accepted (i.e., a positive response). If the provider mobile electronic device 18 transmits a positive response to the operations server 14, the operations server 14 may treat this as a completed match, e.g., if only one service run conformation request was sent. Alternatively, the operations server 14 may compare the response against others, for example based upon promptness of response, and finally select a provider to conduct the service run for the customer. The operations server 14 may then optionally provider a final notice of confirmation to the provider that it has been awarded the service run. If the provider's response is negative, the operations software application 26 may be configured to move to the second provider on a qualifying providers list and/or to engage in a second matching step iteration to repeat the foregoing process.

Referring to step 103, the operations software application 26 may be configured to transmit customer information to the provider using communication element 30. Customer location information may be gathered and transmitted to the operations server 14 continuously, periodically and/or on demand by the provider and/or customer. The customer location information may be transmitted by the operations server 14 to the provider software application 22. The provider mobile electronic device 18 may display the customer location information on the screen or display 58 of the provider mobile electronic device 18, for example to keep the provider apprised of any changes in position of the customer following the initialization of the service run.

Referring to step 104, the provider software application 22 may further be configured to transmit to the customer mobile electronic device 20 (see, e.g., FIG. 5) and/or the operations server 14, and/or to supplement the operations server's 14 database with, a provider employee information bundle. The provider employee information may include provider employee security information, such as a photograph of the employee, contact information specifically for the employee and/or relating to the provider mobile electronic device 18, and/or provider location information for the employee. The provider employee security information may be obtained by selection of an employee sub-profile on the provider mobile electronic device 18 and/or other file containing existing information regarding the employee, by generation of a file manually by the employee, and/or may be automatically obtained at the provider mobile electronic device 18 by the provider software application 22. For example, upon acceptance of a service run, the provider software application 22 may automatically provide a capture timing notification to the screen or display 58 of the provider mobile electronic device 18, for instance notifying the employee that he will have ten seconds to position his face in view of a camera of the device 18. The provider software application 22 may then automatically trigger a corresponding capture by the camera, encrypt the resulting content, and send via secure transmission to the customer and/or operations server 14 for evaluation and/or display on the screen 60 of the customer mobile electronic device 20. It is envisioned that additional types of employee security information may be included in the present technology without departing from the spirit of the present inventive concept.

At least a portion of the provider employee information bundle may be transmitted by the operations server 14 to the customer mobile electronic 20 device for display on the screen 60 of the device 20. The operations server 14 may further transmit an estimated arrival time to the customer mobile electronic device 20 for display thereon. The estimated arrival time may be submitted to the operations server 14 via the provider mobile electronic device 18 or may be calculated from provider location information (with or without optional confirmation of the calculated value by the provider). The estimated arrival time may be automatically calculated by the provider software application 22, operations software application 26, and/or customer software application 24 based upon information obtained from the global positioning receiver 42 of the provider mobile electronic device 18 and/or may be manually input by the provider.

Referring to steps 103 and 104 collectively, the service run having been initiated according to the foregoing process, embodiments of the present technology may enable continuous contact and tracking between the provider, customer and operations server 14. For example, the provider software application 22 may be configured to cause continuous acquisition of provider location information and transmission of same to the customer mobile electronic device 20, e.g., via the operations server 14. The provider software application 22 may instruct acquisition of the provider location information by global positioning receiver 42 and/or via manual input by the provider at the provider mobile electronic device 18. The display 60 of the customer mobile electronic device 20 may continuously provide a real-time progress graphic to the customer regarding the service run. The provider location information may alternatively be transmitted to and/or displayed by the customer mobile electronic device 20 upon manual request by the customer via the customer software application 24.

The provider location information and/or customer location information may optionally be further processed into an e-alert format by any of the customer software application 24, provider software application 22 and/or operations software application 26. An e-alert format is one configured to provide additional context to the location information, for example by associating provider location information with a midpoint between an initial provider location and the customer's location, or with a "ten minutes to estimated arrival time," or with other similar information that may be useful to the customer in understanding the provider's progress.

The e-alert format information may be displayed on the screen 60, 58 of the customer mobile electronic device 20 and/or provider mobile electronic device 18 automatically as an overlay on a real-time tracking map application graphic and/or may be stored as a series of discrete notifications accessible by the customer and/or provider. The provider location information in e-alert format may be continuously made available at the mobile electronic device(s) 18, 20 or periodically generated automatically or upon request as a series of e-alerts. It is envisioned that a variety of similar e-alert formats may be employed with the present technology without departing from the spirit of the present inventive concept.

Referring to step 105, the operations server 14 determines an indication of service run completion. In one example, the indication of service run completion may include comparison of the customer location information with the provider location information. Once the positions of the customer and provider converge, and then diverge a sufficient distance, for example according to a pre-determined range of times and geographic radius parameters, the indication of service run completion may be determined. The operations server 14 may optionally issue a completion confirmation request to the customer and/or provider. Alternatively, the operations server 14 will merely receive a voluntarily-provided indication from at least one of the customer mobile electronic device 20 and provider mobile electronic device 18, indicating the service run is complete.

Referring to step 106, following completion of the service run, the operations server 14 proceeds with completing the billing process for the service run. For example, the customer may enter and transmit an indication of desired payment at the customer mobile electronic device 20, essentially instigating the billing process and signaling the run has been successfully and satisfactorily completed. The operations server 14 may receive such an indication and issue a notification of payment to the provider, signaling the occurrence of the foregoing. Alternatively, the provider may enter an indication of desired payment via the provider mobile electronic device 18. In either case, the operations server 14 may respond with appropriate invoicing documents issued to one or both of the customer and provider. The operations server 14 may alternatively automatically issue an invoice based upon determination of an indication of service run completion by the customer software application 24 and/or by the operations software application 26. The operations server 14 may automatically issue an invoice based upon the indication of service run completion. It is envisioned that other facts may be relied onto determine the indication of service run completion without departing from the spirit of the present inventive concept.

Referring to step 107, the operations server 14 will continuously and/or upon completion of each service run, aggregate, analyze and store performance data. Data that is generated regarding the performance and representations made by each provider may be recorded throughout the service runs and saved to the provider database. The customer software application 24 may further be configured to collect subjective customer feedback, for example relating to any security or performance concerns identified by the customer. Such information may be transmitted to the operations server 14 for storage in association with the provider database, any may be flagged as having been obtained through subjective observation mechanisms.

In addition, accumulated data regarding the steps and methods performed according to the above may be stored with reference specifically to each provider and provider employee, respectively, in provider performance profiles and provider employee performance sub-profiles. For instance, the operations server 14 may instruct the memory element 38 to store provider location information over the course of each service run. The processing element 34 of the operations server may compare the actual arrival time information against estimated arrival time data to determine efficiency and response time as compared with promises made before being awarded the service run. The operations server 14 may further determine time to service completion, which may be stored and/or compared against at least one of (a) average times to service completion of other providers, and (b) a standard time to service completion associated with a category of the service runs. The memory element 38 may be configured to store the results of the time to service completion information. It is envisioned that additional useful analyses may be performed on the data collected by the present technology, and may be stored and relied upon for an improved customer experience, without departing from the spirit of the present inventive concept.

The method 100 may include additional, less, or alternate actions, including those discussed elsewhere herein, and/or may be implemented via a computer system, communication network, one or more processors or servers (e.g., communication beacons, vehicle control/communication systems, mobile devices, and/or remote servers), and/or computer-executable instructions stored on non-transitory storage media or computer readable medium.

Another Exemplary System Embodiment

Referring again to FIGS. 1-5, another exemplary system for providing dynamic roadside assistance coordination is described. The present embodiments described in this patent application and other possible embodiments may relate to systems and methods for providing dynamic roadside assistance coordination. A plurality of customers that may seek roadside assistance may each be provided a copy of a customer software application 24 for installation and execution on a customer mobile electronic device 20. A plurality of roadside assistance providers may each similarly be provided a copy of a complementary provider software application 22 for installation and execution on a mobile electronic device 18. These software applications 22, 24 may be specifically configured to guide the performance of certain tasks unique to the hardware capabilities of such mobile electronic devices 18, 20.

For the avoidance of doubt, each such software application 22, 24 may be differently configured as installed on each device 18, 20, may be at a different stage of update/upgrade, and/or may have access to different data, while still being considered a "copy" respectively of the "customer software application" 22 or "provider software application" 24. To be considered a copy of such a category of each respective software application 22, 24 an application need merely be configured to perform the recited task(s). While certain claims may recite distribution of many copies of a single customer software application 24 and many copies of a single provider software application 22, most of the description provided herein focuses on a single instance of each and related use scenarios, with the understanding that similarly-situated customers and providers may utilize the system in similar ways without departing from the spirit of the present inventive concept. However, it is also important to recognize the ingenuity and usefulness of utilizing a distributed network of such applications 22, 24 and gathering the resulting data over time into a robust and comprehensive database comprising objectively-gathered information.

Returning to a general discussion of a system of the present technology, the coordinated execution of the software applications 22, 24 in conjunction with execution of central operations software application 26 on operations server 14, may provide an information flow and series of user interface interactions that improves the security, efficiency, and repeatability of quality roadside assistance services.

The customer may use the customer software application 24 to request a roadside service run by selecting a desired provider type. The customer software application 24 may be configured to employ known secure login techniques, such as password entry gateway, to permit access and use. The customer software application 24 may be configured to permit the customer to select the desired provider type from among, for example, any of (a) tow, (b) lock out relief, (c) tire change, (d) jump start, and (e) fuel delivery. In some cases, the customer software application 24 may be configured to support a single provider type, for example only tow service providers, and thus selection of a desired provider type may simply comprise the customer's entry of a request for service.

The customer software application 24 may also be configured to instruct the collection of customer location information. The customer location information may be collected via global positioning receiver 44 of the customer mobile electronic device 20. The customer location information may alternatively be collected by the customer software application 24 via manual input at the customer mobile electronic device 20. The customer location information may be collected periodically or continuously by the customer software application 24, but may also be collected only once in connection with each requested service run. Collection may also be performed autonomously by the installed customer software application 24, or may be triggered by the customer, for example through selection of the desired provider type. The mode of collection for customer location information may be configured at least in part by the customer's selection of privacy setting during a setup or subsequent configuration process for the customer software application 24.

The customer software application 24 may further be configured to combine the customer location information and desired provider type with additional information in a customer information bundle prior to or following the initial transmission by the customer mobile electronic 20 device to the operations server 14. Such additional information may include customer contact information and an insurance coverage type of the customer. The customer contact information may include a telephone number, e-mail address, physical address, or other similar information. The insurance coverage type may be a reference to a specific customer policy, group number, or type of policy such as "roadside plus" or similar moniker identifiable by the operations server as representing a level of coverage.

The customer mobile electronic device 20 may transmit the customer information bundle to the operations server 14. The operations server 14 may include processing element 34 for executing the operations software application 26 and a memory element 38 configured to store a provider database containing availability information for a plurality of roadside assistance providers. The database may include information regarding a single provider type or several provider types. The availability information may include a range of geographic services offered by the provider and/or provider location information. The availability information may also include coverage criteria such as a flag associated with each of the plurality of roadside assistance providers indicating a network status of "in-network" or "out-of-network," i.e., indicating a qualification to complete the service run under one or more insurance coverage types. The coverage criteria may also be based upon an insurance policy status of the customer. Other known factors for determining insurance coverage may also be considered "coverage criteria" hereunder without departing from the spirit of the present inventive concept. The availability information may further include information about the pricing offered by the plurality of roadside assistance providers.

Upon receipt of the customer information bundle, the operations software application 26 of the operations server 14 may be configured to match the customer to a provider using the provider database. For example, the desired provider type may be compared against the range of services offered by each provider in the database. Customer location information may be compared against the range of geographic services offered by qualifying providers and/or against such providers' location information to determine proximity and therefore likelihood of expedient completion of the service run. The operations server 14 may further determine a list of qualifying providers by comparing against coverage criteria, for example by comparing the insurance coverage type of the customer against the network status flags of the providers to aid the customer in choosing a provider that qualifies to perform the service run under the customer's insurance policy.

Where the coverage criteria is not stored locally, the operations software application 26 of the operations server 14 may be configured to transmit at least a portion of the customer information bundle to second server 16 having second processing element 36 for performing the desired analysis. The operations software application 26 of the operations server 14 may also be configured to receive the results of such a comparison, i.e., the indication of coverage criteria satisfaction, from the second server 16. Where several providers result from one or more of the above comparisons, the operations server 14 may transmit a request to the qualifying providers for voluntary submission of an estimated arrival time and/or an opportunity to submit a lower price bid, and may further refine the list of qualifying providers according to the fastest response time and/or lowest bid.

The operations software application 26 of the operations server 14 may further be configured to send one or more qualifying service providers a service run confirmation request. The service run confirmation request may be sent to the provider's mobile electronic device 18. The provider software application 22 may be configured to display at the user interface of the device an option for the provider to select or confirm whether the service run is accepted (i.e., a positive response). If the provider mobile electronic device 18 transmits a positive response to the operations server 14, the operations server 14 may treat this as a completed match, e.g., if only one service run confirmation request was sent. Alternatively, the operations software application 26 of the operations server 14 may be configured to compare the response against others, for example based upon promptness of response, and finally select a provider to conduct the service run for the customer. The operations server 14 may then optionally provider a final notice of confirmation to the provider that it has been awarded the service run. If the provider's response is negative, the operations software application 26 may be configured to move to the second provider on a qualifying providers list and/or to engage in a second matching step iteration to repeat the foregoing process.

The provider software application 22 may further be configured to transmit to the customer mobile electronic device 20 and/or the operations server 14, and/or to supplement the operations server's 14 database with, a provider employee information bundle. The provider employee information may include provider employee security information such as a photograph of the employee, contact information specifically for the employee and/or relating to the provider mobile electronic device 18, and/or provider location information for the employee. The provider employee security information may be obtained by selection of an employee sub-profile on the provider mobile electronic device 18 and/or other file containing existing information regarding the employee, by generation of a file manually by the employee, and/or may be automatically obtained at the provider mobile electronic device 18 by the provider software application 22. For example, upon acceptance of a service run, the provider software application 22 may be configured to automatically provide a capture timing notification to the screen 58 of the provider mobile electronic device 18, for instance notifying the employee that he will have ten second to position his face in view of a camera of the device. The provider software application 22 may then automatically trigger a corresponding capture by the camera, encrypt the resulting content, and send via secure transmission to the customer and/or operations server 14 for evaluation and/or display on the screen 60 of the customer mobile electronic device 20. It is envisioned that additional types of employee security information may be included in the present technology without departing from the spirit of the present inventive concept.

The operations software application 26 may further be configured to transmit at least a portion of the provider employee information to the customer mobile electronic device 20 for display on the screen of the device 20. The operations software application 26 may further be configured to transmit an estimated arrival time to the customer mobile electronic device 20 for display thereon. The estimated arrival time may be submitted to the operations server 14 via the provider mobile electronic device 18 or may be calculated from provider location information (with or without optional confirmation of the calculated value by the provider). The estimated arrival time may be automatically calculated by the provider software application 22, operations software application 26, and/or customer software application 24 based upon information obtained from the global positioning receiver 42 of the provider mobile electronic device 18 and/or may be manually input by the provider.

The service run having been initiated according to the foregoing description, embodiments of the present technology may enable continuous contact and tracking between the provider, customer and operations server 14. For example, the provider software application 22 may be configured to cause continuous acquisition of provider location information and transmission of same to the customer mobile electronic device 20, e.g., via the operations server 14. The provider software application 22 may instruct acquisition of the provider location information by a global positioning receiver 42 and/or via manual input by the provider at the provider mobile electronic device 18. The display 60 of the customer mobile electronic device 20 may continuously provide a real-time progress graphic to the customer regarding the service run. The provider location information may alternatively be transmitted to and/or displayed by the customer mobile electronic device 20 upon manual request by the customer via the customer software application 24.

The customer location information may also be gathered and transmitted to the operations server 14 continuously, periodically and/or on demand by the provider and/or customer. The operations software application 26 may be configured to transmit the customer location information to the provider software application 22. The provider software application 22 may be configured to display the customer location information on the screen 58 of the provider mobile electronic device 18, for example to keep the provider apprised of any changes in position of the customer following the initialization of the service run.

The provider location information and/or customer location information may optionally be further processed into an e-alert format by any of the customer software application 24, provider software application 22 and/or operations software application 26. An e-alert format is one configured to provide additional context to the location information, for example by associating provider location information with a midpoint between an initial provider location and the customer's location, or with a "ten minutes to estimated arrival time," or with other similar information that may be useful to the customer in understanding the provider's progress. The e-alert format information may be displayed on the screen 60, 58 of the customer mobile electronic device 20 and/or provider mobile electronic device 18 automatically as an overlay on a real-time tracking map graphic and/or may be stored as a series of discrete notifications accessible by the customer and/or provider. The provider location information in e-alert format may be continuously made available at the mobile electronic device(s) 18, 20 or periodically generated automatically or upon request as a series of e-alerts. It is envisioned that a variety of similar e-alert formats may be employed with the present technology without departing from the spirit of the present inventive concept.

In addition, the customer software application 24 may be configured to periodically or continuously, and/or upon request, display the personal employee information of the provider employee information bundle. Moreover, data that is generated regarding the performance and representations made by each provider may be recorded throughout the service runs and saved to the provider database. The customer software application 24 may further be configured to collect subjective customer feedback, for example relating to any security or performance concerns identified by the customer. Such information may be transmitted to the operations server 14 for storage in association with the provider database, any may be flagged as having been obtained through subject observation mechanisms.

Following completion of the service run, the customer may enter and transmit an indication of desired payment at the customer mobile electronic device 20, essentially instigating the billing process and signaling the run has been successfully and satisfactorily completed. The operations server 14 may receive such an indication and its operations software application 26 may be configured to issue a notification of payment to the provider, signaling the occurrence of the foregoing. Alternatively, the provider may enter an indication of desired payment via the provider mobile electronic device 18. In either case, the operations software application 26 of the operations server 14 may be configured to respond with appropriate invoicing documents issued to one or both of the customer and provider. The operations software application 26 may alternatively be configured to automatically issue an invoice based upon determination of an indication of service run completion by the customer software application 24 and/or by the operations software application 26. In one example, the indication of service n completion may include comparison of the customer location information with the provider location information. Once the positions of the customer and provider converge, and then diverge a sufficient distance, for example according to a pre-determined range of times and geographic radius parameters, the indication of service run completion may be determined. The operations software application 26 may be configured optionally to issue a completion confirmation request to the customer and/or provider. The operations server 14 may automatically issue an invoice based upon the indication of service run completion. It is envisioned that other facts may be relied on to determine the indication of service run completion without departing from the spirit of the present inventive concept.

In addition, accumulated data regarding the steps and methods performed according to the above may be stored with reference specifically to each provider and provider employee, respectively, in provider performance profiles and provider employee performance sub-profiles. For instance, the operations software application 26 may be configured to instruct the memory element 38 to store provider location information over the course of each service run. The processing element 34 of the operations server 14 may compare the actual arrival time information against estimated arrival time data to determine efficiency and response time as compared with promises made before being awarded the service run. The operations software application 26 may further be configured to determine time to service completion, which may be stored and/or compared against at least one of (a) average times to service completion of other providers, and (b) a standard time to service completion associated with a category of the service runs. The memory element 38 may be configured to store the results of the time to service completion information.

It is envisioned that additional useful analyses may be performed on the data collected by the present technology, and may be stored and relied upon for an improved customer experience, without departing from the spirit of the present inventive concept. The system may include additional, less, or alternate functionality, including that discussed elsewhere herein.

Another Exemplary Embodiment

Referring to FIGS. 7A-7D, another exemplary system 200 (comprising collectively those components designated 200a-200d) and method for providing dynamic roadside assistance coordination is described. A customer that may seek roadside assistance may be provided a copy of a customer software application 202 for installation and execution on a customer mobile electronic device (not shown in FIG. 7). A roadside assistance provider such as a tow truck service or other service provider may similarly be provided a copy of a complementary provider software application 204 for installation and execution on a provider mobile electronic device (not shown in FIG. 7). These software applications 202, 204 may be specifically configured to guide the performance of certain tasks unique to the hardware capabilities of such mobile electronic devices. The software applications 202,204 may, for example, be provided under or in connection with the registered service mark Pocket Agent®.

Referring to step 300, the customer may access the customer software application 202 via a login procedure using user information, and may select a desired provider type or service type. The customer may select the desired provider type from a tab or menu of the customer software application 202 labeled "On the Road," for example. The service types may include (a) Towing; (b) Lock out; (c) Tire change; (d) Jump start; and/or (e) Fuel delivery.

Referring to step 302, once the service type is selected, one or more of the following types of information may be sent to a third party administrator or "TPA," for example via an operations server (not shown in FIG. 7), and/or to the provider mobile electronic device: (i) GPS-detected data regarding customer's location; (ii) the service type the customer or user selected; (iii) the user's contact phone number; and/or (iv) coverage/policy information regarding the user or customer.

Referring to step 304, the operations server may match the customer to otherwise match with the closest available provider using at least some of the customer information provided under step 302, for example by relying on customer location information. The operations server may further send the assignment, or transmit a service run confirmation request, to the provider mobile electronic device. Such a provider may utilize the provider software application 204 to accept the service run or assignment. The operations server may further transmit to the provider all or some of the information transmitted in step 302, and may further transmit an indication of whether insurance coverage applies to the service run, or of whether a coverage criteria has been satisfied. This may indicate to the provider whether an invoice will or should be issued to the TPA and/or to the customer directly.

The provider software application 204 may further transmit to the operations server and/or customer mobile electronic device one or more of the following types of information: (1) GPS-detected provider location information, for example in global positioning coordinate format, regarding the driver or employee of the provider; (2) a photograph of the driver; and/or (3) contact phone number for the driver. The provider may also be prompted by the provider software application 204 and/or by the operations server to enter an estimated arrival time and/or consent to transmission of an automatically-generated estimated arrival time based upon the provider employee's then-current or projected provider location information, for example where such information is obtained via a GPS receiver of the provider mobile electronic device.

Referring to step 306, the operations server may then transmit one or more of the following types of information to the customer mobile electronic device and/or provide instructions for the display of one or more of the following on a screen thereof: (A) the driver's estimated arrival time; (B) a map of the driver or provider employee's location based upon GPS receiver-generated data: (C) driver or provider employee's telephone number or other contact information; and/or (D) a photograph of the driver or provider employee.

Referring to step 308, the customer software application 202 may enable the customer to track the provider employee or driver, for example using data in global positioning coordinate format transmitted to the customer mobile electronic device leading to a graphic overlay on a customer map graphic on the customer mobile electronic device. Where the estimated time of arrival is also displayed to the customer, it may be periodically or continuously updated based upon such global positioning coordinate format data regarding the provider employee or driver.

Referring to step 310, once the service or service run is completed, the provider may bill an insurer electronically using the provider software application 204, for example by issuing an indication of desired payment to the operations server. Alternatively or in parallel, the customer may pay an invoice using the customer software application 202, for example issuing in turn his own indication of desired payment to the operations server.

The system 200 may include additional, less, or alternate functionality, including that discussed elsewhere herein. The method may include additional, less, or alternate actions, including those discussed elsewhere herein, and/or may be implemented via a computer system, communication network, one or more processors or servers (e.g., communication beacons, vehicle control/communication systems, mobile devices, and/or remote servers), and/or computer-executable instructions stored on non-transitory storage media or computer readable medium.

Exemplary Insurance Provider Remote Server

In one aspect, a computer-implemented method for facilitating roadside assistance, such as implemented via an insurance provider remote server, may be provided. The computer-implemented method may include (1) receiving, at a remote server (or associated transceiver), such as via wireless communication and/or data transmission, an indication that a customer is in need of roadside assistance from a secure application running on a mobile device or smart vehicle controller associated with a customer, the secure application requiring customer login, such as a secure application requiring customer user ID and password information to login, and the indication further including a current GPS location of the customer mobile device or smart vehicle ("customer location"). The method may include: (2) determining, at the remote server, either indirectly or directly, a closest "trusted" service provider that provides roadside assistance, a "trusted" service provider being determined from customer rankings or ratings, quality of service or repairs, and/or fastest response time; (3) sending, at or from the remote server (or associated transceiver), such as via wireless communication, (i) a request to the trusted service provider (or an associated computing device or server thereof) that the trusted service provider proceed to the customer location to render roadside assistance, and/or (ii) a current customer GPS location; (4) receiving, at the remote server (or associated transceiver), such as via wireless communication, (a) an indication that the trusted service provider is in route or otherwise responding to the customer request for roadside assistance, (b) a current GPS location of the trusted service provider (or their tow vehicle), and/or (c) an estimated time of arrival to the customer location; and/or (5) transmitting, from the remote server (or associated transceiver), to the mobile device or smart vehicle controller of the customer (such as via wireless communication or data transmission) (i) an indication that a trusted service provider is in transit to the customer or smart vehicle location, (ii) an indication of the current GPS location of the trusted service provider, (iii) an estimated time of arrival of the trusted service provider at the customer location, and/or (iv) an indication of the identity of the trusted service provider/driver (such as for display on the customer mobile device or smart vehicle display). As a result, (a) acknowledging the customer's request for roadside assistance, and (b) promptly providing quality roadside assistance to the customer may be facilitated.

The method may include additional, less, or alternate actions, including those discussed elsewhere herein. For instance, the remote server (or associated transceiver) may further transmit an electronic payment to the trusted service provider for services related to providing the roadside assistance to the customer, such as in accordance with an insurance policy associated with the customer. The method may be implemented via one or more local or remote processors.

Exemplary Customer Mobile Device or Smart Vehicle

In one aspect, a computer-implemented method for facilitating roadside assistance, such as via a customer's mobile device or smart vehicle controller may be provided. The computer-implemented method may include: (1) receiving, via one or more processors (such as a mobile device or smart vehicle controller processor, and/or an application running thereon), login information (e.g., user ID and password); (2) verifying, via the one or more processors, that the login information, such as the user ID and password, are associated with the customer to verify secure login; (3) receiving, via the one or more processors, an indication that the customer is in need of roadside assistance, such as by the customer pressing an icon on the mobile device or smart vehicle display associating with towing services; (4) generating, via the one or more processors, a roadside assistance message, the roadside assistance message indicating a request for towing or other roadside assistance (e.g., police, ambulance, etc.), and a current GPS location associated with the customer mobile device or vehicle; (5) transmitting, via the one or more processors (or associated transceiver), such as via wireless communication or data transmission, the roadside assistance message directly or indirectly to a service provider remote server or other computing device (e.g., indirect transmission may include first transmitting the roadside assistance to a remote server of an insurance provider to allow the insurance provider remote server (i) to select a trusted service provider that has a vehicle in the vicinity of the customer's location, and (ii) then request, on the customer's behalf, that the trusted service provider vehicle proceed to the customer's location and render roadside assistance); (6) receiving, via the one or more processors (or associated transceiver), a reply message (such as via wireless communication or data transmission), the reply message indicating (a) that roadside assistance is on the way; (b) an identification of the roadside assistance service provider and/or driver; (c) a current location of a service provider vehicle in route to the customer's location; and/or (d) an estimated time of arrival of the service provider vehicle at the customer's location; and/or (7) displaying, via the one or more processors, all or portions of the reply message on a display screen of the mobile device (or smart vehicle display) to facilitating providing prompt quality roadside assistance to customers and letting each customer know that their request has been received, a trusted service provider (or roadside assistance) is on the way, the current location of the trusted service provider vehicle, and/or the identity of the trusted service provider (and/or an associated driver).

The method may include additional, less, or alternate actions, including that discussed elsewhere herein. For instance, an insurance provider remote server may further transmit an electronic payment to the trusted service provider computing device or server for services related to providing the roadside assistance to the customer, such as in accordance with an insurance policy associated with the customer.

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

We claim:

1. A computer-implemented method for providing dynamic roadside assistance coordination, the method comprising:
    receiving customer location information from a mobile device of a customer;
    matching, via a server, the customer to a provider based upon the customer location information and availability information relating to a plurality of roadside assistance service providers, the plurality of roadside assistance service providers including the provider, the availability information including an indication of a qualification to complete a service run under one or more insurance coverage types;
    receiving provider location information of the provider relating to the service run; and
    converting the provider location information into an e-alert format, the e-alert format comprising additional context to the provider location information and text to be used as at least one of an overlay on a real-time tracking map and a discrete notification.

2. The computer-implemented method of claim 1, further comprising:
    transmitting the provider location information to the mobile device of the customer.

3. The computer-implemented method of claim 1, further comprising:
    transmitting the provider location information to the mobile device of the customer via a series of e-alerts.

4. The computer-implemented method of claim 1, wherein the provider location information is received continuously from a provider mobile device.

5. The computer-implemented method of claim 1, further comprising:
    transmitting the customer location information to a provider mobile device.

6. The computer-implemented method of claim 1, wherein the provider location information and the customer location information are received in a global positioning coordinate format.

7. The computer-implemented method of claim 1, further comprising:
    receiving desired provider type information from the mobile device of the customer;
    comparing the desired provider type against a provider type stored in a memory element of the server, and
    determining if the desired provider type satisfies a coverage criteria associated with the customer.

8. The computer-implemented method of claim 7, wherein the coverage criteria is based upon an insurance policy status.

9. The computer-implemented method of claim 1, further comprising transmitting, via the server and following the matching step, a service run confirmation request to the provider.

10. The computer-implemented method of claim 9, further comprising receiving a response to the service run confirmation request and, if the response is negative, performing a second matching step.

11. The computer-implemented method of claim 9, wherein the service run confirmation request is transmitted to a provider mobile device.

12. The computer-implemented method of claim 9, further comprising receiving at the server, after the provider has positively affirmed the service run confirmation request, an estimated arrival time relating to the service run.

13. The computer-implemented method of claim 12, further comprising transmitting the estimated arrival time to the customer mobile device.

14. The computer-implemented method of claim 12, wherein the estimated arrival time comprises provider location information.

15. The computer-implemented method of claim 14, wherein the provider location information in the estimated arrival time includes data in a global positioning coordinate format.

16. The computer-implemented method of claim 1, further comprising:
    processing the provider location information to determine a time to arrival on site for the service run.

17. The computer-implemented method of claim 1, further comprising obtaining and transmitting provider employee security information to the customer mobile device, the employee security information including a photograph of the employee.

18. The computer-implemented method of claim 17, wherein the provider employee security information is obtained via activation of a sensor of a provider mobile device.

19. The computer-implemented method of claim 1, wherein the availability information further includes information about pricing offered by the plurality of roadside assistance service providers.

20. The computer-implemented method of claim 1, wherein the provider bills an insurer electronically using a provider software application.

* * * * *